United States Patent
Stenneth et al.

(10) Patent No.: US 11,423,925 B2
(45) Date of Patent: Aug. 23, 2022

(54) METHOD AND APPARATUS FOR DETERMINING VEHICLE CLASS BASED UPON AUDIO DATA

(71) Applicant: HERE Global B.V., Eindhoven (NL)

(72) Inventors: Leon Stenneth, Chicago, IL (US); Jeremy Michael Young, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/129,477

(22) Filed: Dec. 21, 2020

(65) Prior Publication Data

US 2021/0375305 A1 Dec. 2, 2021

Related U.S. Application Data

(60) Provisional application No. 63/031,036, filed on May 28, 2020.

(51) Int. Cl.
*H04R 29/00* (2006.01)
*G10L 25/51* (2013.01)
(Continued)

(52) U.S. Cl.
CPC ............... *G10L 25/51* (2013.01); *G06N 5/04* (2013.01); *G06N 20/00* (2019.01); *G10L 25/18* (2013.01)

(58) Field of Classification Search
CPC ..................................................... H04R 29/00
See application file for complete search history.

(56) References Cited

U.S. PATENT DOCUMENTS

| | | | |
|---|---|---|---|
| 8,111,174 B2 * | 2/2012 | Berger | G08G 1/015 340/933 |
| 8,983,677 B2 * | 3/2015 | Wright | H04B 11/00 701/1 |

(Continued)

FOREIGN PATENT DOCUMENTS

GB 2568761 A 5/2019

OTHER PUBLICATIONS

Kandpal et al., *Classification of Ground Vehicles Using Acoustic Signal Processing and Neural Network Classifier*, ResearchGate, Conference Paper, Dec. 2013 (8 pages).

(Continued)

*Primary Examiner* — Olisa Anwah
(74) *Attorney, Agent, or Firm* — Jeffrey R. Moisan; HERE Technologies (57) ABSTRACT

A method, apparatus and computer program product are provided to identify the class of vehicle driving over a road surface based upon audio data collected as the vehicle drives thereover. With respect to predicting a class of a vehicle, audio data is obtained that is created by the vehicle while driving over the road surface. The audio data includes one or more audio frequency features and/or one or more audio amplitude features. The audio data including the one or more audio frequency features and/or the one or more audio amplitude features is provided to a machine learning model and the class of the vehicle that created the audio data is predicted utilizing the machine learning model. A method, apparatus and computer program product are also provided for training the machine learning model to predict the class of the vehicle driving over the road surface.

14 Claims, 3 Drawing Sheets

(51) Int. Cl.
*G06N 5/04* (2006.01)
*G06N 20/00* (2019.01)
*G10L 25/18* (2013.01)

(56) References Cited

U.S. PATENT DOCUMENTS 10,354,534 B1 * 7/2019 Sanchez ................ G08G 1/20
10,403,141 B2   9/2019 Patil et al.

OTHER PUBLICATIONS

George et al. *Exploring Sound Signature for Vehicle Detection and Classification Using Ann*, International Journal on Soft Computing (IJSC) vol. 4, No. 2, May 2013 (8 pages).
Wieczorkpwska et al, *Spectral Features for Audio Based Vehicle and Engine Classification*, J Intell Info Syst (2018) 50:265-290.
Dalir et al, *Classification of Vehicles Based on Audio Signals Using Quadratic Discriminant Analysis and High Energy Feature Vectors*, https://arxiv.org/ftp/arxiv/papers/1804/1804.01212.pdf (19 pages).

* cited by examiner

Figure 5

METHOD AND APPARATUS FOR DETERMINING VEHICLE CLASS BASED UPON AUDIO DATA

CROSS REFERENCE TO RELATED APPLICATION

This application claims benefit of U.S. Provisional Application No. 63/031,036, filed May 28, 2020, which is incorporated herein by reference in its entirety.

TECHNOLOGICAL FIELD

An example embodiment relates generally to a method, apparatus and computer program product for determining the class of a vehicle and, more particularly, for determining the class of a vehicle based upon audio data generated by the vehicle driving over a road surface.

BACKGROUND

Modern vehicles include a plurality of different types of sensors for collecting a wide variety of information. These sensors include location sensors, such as global positioning system (GPS) sensors, configured to determine the location of the vehicle. Based upon the location of the vehicle, a variety of navigational, mapping and other services may be provided for manually driven vehicles as well as the provision of navigation and control of autonomous or semi-autonomous vehicles. Other examples of sensors include cameras or other imaging sensors that capture images of the environment including objects in the vicinity of the vehicle. The images that are captured may be utilized to determine the location of the vehicle with more precision. A more precise determination of the vehicle location may be useful in conjunction with the provision of navigational, mapping and other informational services for a manually driven vehicle. Additionally, the more precise determination of the vehicle location may provide for the improved navigation and control of an autonomous or semi-autonomous vehicle by taking into account the location of other objects, such as other vehicles, in proximity to the vehicle carrying the sensors.

The sensors on board vehicles therefore collect a wide variety of data that may be utilized for various purposes. However, these sensors currently on board vehicles do have limitations and do not collect all of the different types of information that would be useful in various applications.

BRIEF SUMMARY

A method, apparatus and computer program product are provided in accordance with an example embodiment in order to identify the class of vehicle driving over a road surface. In this regard, the method, apparatus and computer program product of an example embodiment utilize audio data collected as the vehicle drives over the road surface and identifies the class of the vehicle based upon the audio data. The reliance upon the collection and analysis of audio data may supplement the information provided by other sensors on board the vehicle and allow for the provision of different information, such as the class of the vehicle, that is useful for a variety of applications. By way of example, the identification of the class of vehicle driving over a road surface may be useful for federal, state, local or other governmental or regulatory officials that design and maintain the road network. As another example, the identification of the class of vehicle driving over a road surface may be useful in relation to the provision of more relevant information to the vehicle and/or the driver of the vehicle.

In an example embodiment, an apparatus is provided that is configured to predict a class of a vehicle based at least in part on audio data. The apparatus includes at least one processor and at least one memory storing computer program code with the at least one memory and the computer program code configured to, with the processor, cause the apparatus to at least obtain the audio data created by the vehicle while driving over a road surface. The audio data includes a plurality of audio features including one or more audio amplitude features and/or one or more audio frequency features. The at least one memory and the computer program code are also configured to, with the processor, cause the apparatus to provide the audio data including the one or more audio amplitude features and/or the one or more audio frequency features to a machine learning model. The at least one memory and the computer program code are further configured to, with the processor, cause the apparatus to predict the class of the vehicle that created the audio data utilizing the machine learning model.

The at least one memory and the computer program code are further configured to, with the processor, cause the apparatus of an example embodiment to identify one or more map objects and to provide information regarding the one or more map objects to the machine learning model. The at least one memory and the computer program code are also configured to, with the processor, cause the apparatus of this example embodiment to predict the class of the vehicle by predicting the class of the vehicle utilizing the machine learning model and based upon the one or more map objects and the audio data. In this example embodiment, the at least one memory and the computer program code may be further configured to, with the processor, cause the apparatus to receive an indication of a location of the vehicle. The at least one memory and the computer program code are also configured to, with the processor, cause the apparatus of this example embodiment to obtain the audio data by obtaining the audio data captured proximate the location of the vehicle. The at least one memory and the computer program code are further configured to, with the processor, cause the apparatus of this example embodiment to identify the one or more map objects by identifying the one or more map objects proximate the location of the vehicle.

The at least one memory and the computer program code are configured to, with the processor, cause the apparatus of an example embodiment to obtain the audio data by capturing the audio data associated with one or more respective wheels of the vehicle while driving over the road surface and associating the location of the vehicle during creation of the audio data therewith. In an example embodiment, the one or more audio amplitude features represent a change in amplitude relative to a noise floor and/or the one or more audio frequency features represent a change in frequency relative to a noise floor. The at least one memory and the computer program code are further configured to, with the processor, cause the apparatus of this example embodiment to receive an indication of a speed of the vehicle and to determine the noise floor based at least in part upon the speed of the vehicle.

In another example embodiment, a method is provided for predicting a class of a vehicle based at least in part on audio data. The method includes obtaining the audio data created by the vehicle while driving over a road surface. The audio data includes a plurality of audio features including one or more audio frequency features and/or one or more audio amplitude features. The method also includes providing the audio data including the one or more audio frequency features and/or the one or more audio amplitude features to a machine learning model and predicting the class of the vehicle that created the audio data utilizing the machine learning model.

The method of an example embodiment also includes identifying one or more map objects and providing information regarding the one or more map objects to the machine learning model. In this example embodiment, the method predicts the class of the vehicle by predicting the class of the vehicle utilizing the machine learning model and based upon the one or more map objects and the audio data. The method of this example embodiment may also include receiving an indication of a location of the vehicle. In this example embodiment, the method obtains the audio data by obtaining the audio data captured proximate the location of the vehicle, and identifies the one or more map objects by identifying the one or more map objects proximate the location of the vehicle.

The method of an example embodiment obtains the audio data by capturing the audio data associated with one or more respective wheels of the vehicle while driving over the road surface and associates the location of the vehicle during creation of the audio data therewith. In an example embodiment, the one or more audio amplitude features represent a change in amplitude relative to a noise floor and/or the one or more audio frequency features represent a change in frequency relative to a noise floor. The method of this example embodiment also includes receiving an indication of a speed of the vehicle and determining the noise floor based at least in part upon the speed of the vehicle.

In a further example embodiment, a computer program product is provided that includes a non-transitory computer readable medium having program code portions stored thereon with the program code portions being configured, upon execution, to predict a class of a vehicle based at least in part on audio data. The program code portions are also configured to obtain the audio data created by the vehicle while driving over a road surface. The audio data includes a plurality of audio features including one or more audio frequency features and/or one or more audio amplitude features. The program code portions are further configured to provide the audio data including the one or more audio frequency features and/or the one or more audio amplitude features to a machine learning model and to predict the class of the vehicle that created the audio data utilizing the machine learning model.

The program code portions of an example embodiment are also configured to identify one or more map objects and to provide information regarding the one or more map objects to the machine learning model. In this example embodiment, the program code portions configured to predict the class of the vehicle include program code portions are configured to predict the class of the vehicle utilizing the machine learning model and based upon the one or more map objects and the audio data. The program code portions of this example embodiment may also be configured to receive an indication of a location of the vehicle. In this example embodiment, the program code portions configured to obtain the audio data include program code portions configured to obtain the audio data captured proximate the location of the vehicle, and the program code portions configured to identify the one or more map objects include program code portions configured to identify the one or more map objects proximate the location of the vehicle.

The program code portions of an example embodiment that are configured to obtain the audio data include program code portions configured to capture the audio data associated with one or more respective wheels of the vehicle while driving over the road surface and program code portions configured to associate the location of the vehicle during creation of the audio data therewith. In an example embodiment, the one or more audio amplitude features represent a change in amplitude relative to a noise floor and/or the one or more audio frequency features represent a change in frequency relative to a noise floor. The program code portions of this example embodiment also include program code portions configured to receive an indication of a speed of the vehicle and program code portions configured to determine the noise floor based at least in part upon the speed of the vehicle.

In yet another example embodiment, an apparatus is provided for predicting a class of a vehicle based at least in part on audio data. The apparatus includes means for obtaining the audio data created by the vehicle while driving over a road surface. The audio data includes a plurality of audio features including one or more audio frequency features and/or one or more audio amplitude features. The apparatus also includes means for providing the audio data including the one or more audio frequency features and/or the one or more audio amplitude features to a machine learning model and means for predicting the class of the vehicle that created the audio data utilizing the machine learning model.

The apparatus of an example embodiment also includes means for identifying one or more map objects and means for providing information regarding the one or more map objects to the machine learning model. In this example embodiment, the means for predicting the class of the vehicle includes means for predicting the class of the vehicle utilizing the machine learning model and based upon the one or more map objects and the audio data. The apparatus of this example embodiment may also include means for receiving an indication of a location of the vehicle. In this example embodiment, the means for obtaining the audio data includes means for obtaining the audio data captured proximate the location of the vehicle, and the means for identifying the one or more map objects includes means for identifying the one or more map objects proximate the location of the vehicle.

In an example embodiment, the means for obtaining the audio data includes means for capturing the audio data associated with one or more respective wheels of the vehicle while driving over the road surface and means for associating the location of the vehicle during creation of the audio data therewith. In an example embodiment, the one or more audio amplitude features represent a change in amplitude relative to a noise floor and/or the one or more audio frequency features represent a change in frequency relative to a noise floor. The apparatus of this example embodiment also includes means for receiving an indication of a speed of the vehicle and means for determining the noise floor based at least in part upon the speed of the vehicle.

In an example embodiment, an apparatus is provided that is configured to train a machine learning model to predict a class of an unknown vehicle driving over a road surface. The apparatus includes at least one processor and at least one memory storing computer program code with the at least one memory and the computer program code configured to, with the processor, cause the apparatus to at least provide a training dataset including a plurality of training examples. A respective training example includes audio data created by a vehicle of a known class while driving over a road surface.

The audio data includes a plurality of audio features including one or more audio features selected from a group of one or more audio amplitude features and/or one or more audio frequency features. The respective training example also includes the class of the vehicle that created the audio data. The at least one memory and the computer program code are also configured to, with the processor, cause the apparatus to train the machine learning model utilizing the training dataset such that the machine learning model, as trained, is configured to predict the class of the unknown vehicle driven over the road surface based at least in part upon the audio data created by the unknown vehicle.

The respective training example may also include a map object. In this example embodiment, the at least one memory and the computer program code are also configured to, with the processor, cause the apparatus to provide the training dataset by constructing the respective training example by identifying the map object by reference to a map database and identifying the audio data proximate the map object by reference to an audio database. In this example embodiment, the audio data is associated with a location proximate the map object at which the audio data was previously captured. The at least one memory and the computer program code may be further configured to, with the processor, cause the apparatus of this example embodiment to construct the respective training example by identifying the class of the vehicle that created the audio data while driving over the road surface at the location proximate the map object. In this example embodiment, the at least one memory and the computer program code may also be configured to, with the processor, cause the apparatus to identify the audio data by identifying the audio data proximate the map object from an audio layer of the map database. The audio layer of this example embodiment defines a plurality of instances of audio data in association with respective locations. The respective training example may additionally include a speed of the vehicle while driving over the road surface.

In another example embodiment, a method is provided that is configured to train a machine learning model to predict a class of an unknown vehicle driving over a road surface. The method includes providing a training dataset including a plurality of training examples. A respective training example includes audio data created by a vehicle of a known class while driving over a road surface. The audio data includes a plurality of audio features including one or more audio features selected from a group of one or more audio amplitude features and/or one or more audio frequency features. The respective training example also includes the class of the vehicle that created the audio data. The method also includes training the machine learning model utilizing the training dataset such that the machine learning model, as trained, is configured to predict the class of the unknown vehicle driven over the road surface based at least in part upon the audio data created by the unknown vehicle.

The respective training example may also include a map object. In this example embodiment, the method provides the training dataset by constructing the respective training example by identifying the map object by reference to a map database and identifying the audio data proximate the map object by reference to an audio database. In this example embodiment, the audio data is associated with a location proximate the map object at which the audio data was previously captured. The method may construct the respective training example by identifying the class of the vehicle that created the audio data while driving over the road surface at the location proximate the map object. In this example embodiment, the method may identify the audio data by identifying the audio data proximate the map object from an audio layer of the map database. The audio layer of this example embodiment defines a plurality of instances of audio data in association with respective locations. The respective training example may additionally include a speed of the vehicle while driving over the road surface.

In a further example embodiment, a computer program product is provided that is configured to train a machine learning model to predict a class of an unknown vehicle driving over a road surface. The computer program product includes a non-transitory computer readable medium having program code portions stored thereon with the program code portions being configured, upon execution, to provide a training dataset including a plurality of training examples. A respective training example includes audio data created by a vehicle of a known class while driving over a road surface. The audio data includes a plurality of audio features including one or more audio features selected from a group of one or more audio amplitude features and/or one or more audio frequency features. The respective training example also includes the class of the vehicle that created the audio data. The program code portions are also configured to train the machine learning model utilizing the training dataset such that the machine learning model, as trained, is configured to predict the class of the unknown vehicle driven over the road surface based at least in part upon the audio data created by the unknown vehicle.

The respective training example may also include a map object. In this example embodiment, the program code portions configured to provide the training dataset include program code portions configured to construct the respective training example by identifying the map object by reference to a map database and identifying the audio data proximate the map object by reference to an audio database. In this example embodiment, the audio data is associated with a location proximate the map object at which the audio data was previously captured. The program code portions configured to construct the respective training example may include program code portions configured to identify the class of the vehicle that created the audio data while driving over the road surface at the location proximate the map object. In this example embodiment, the program code portions configured to identify the audio data include program code portions configured to identify the audio data proximate the map object from an audio layer of the map database. The audio layer of this example embodiment defines a plurality of instances of audio data in association with respective locations. The respective training example may additionally include a speed of the vehicle while driving over the road surface.

In yet another example embodiment, an apparatus is provided that is configured to train a machine learning model to predict a class of an unknown vehicle driving over a road surface. The apparatus includes means for providing a training dataset including a plurality of training examples. A respective training example includes audio data created by a vehicle of an unknown class while driving over a road surface. The audio data includes a plurality of audio features including one or more audio features selected from a group of one or more audio amplitude features and/or one or more audio frequency features. The respective training example also includes the class of the vehicle that created the audio data. The apparatus also includes means for training the machine learning model utilizing the training dataset such that the machine learning model, as trained, is configured to predict the class of the unknown vehicle driven over the road surface based at least in part upon the audio data created by the unknown vehicle.

The respective training example may also include a map object. In this example embodiment, the means for providing the training dataset includes means for constructing the respective training example by identifying the map object by reference to a map database and identifying the audio data proximate the map object by reference to an audio database. In this example embodiment, the audio data is associated with a location proximate the map object at which the audio data was previously captured. The means for constructing the respective training example may include means for identifying the class of the vehicle that created the audio data while driving over the road surface at the location proximate the map object. In this example embodiment, the means for identifying the audio data includes means for identifying the audio data proximate the map object from an audio layer of the map database. The audio layer of this example embodiment defines a plurality of instances of audio data in association with respective locations. The respective training example may additionally include a speed of the vehicle while driving over the road surface.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to determine the class of a vehicle driving over a road surface based upon audio data generated by the vehicle driving over the road surface and interacting, for example, with one or more objects along the road. By relying upon audio data, a richer and more complete set of data characterizing the vehicle and the road surface may be collected with the information derived from the audio data, such as the class of vehicle, being useful for a variety of different applications. In order to determine the class of vehicle based upon audio data, the method, apparatus and computer program product of an example embodiment are configured to train a machine learning model utilizing training examples that include the class of vehicle and audio data generated by the vehicle while driving over a road surface. Once trained, the method, apparatus and computer program product of another example embodiment utilize the trained machine learning model to analyze audio data that is collected as a vehicle drives over a road surface and that then determines the class of the vehicle that generated the audio data.

The apparatus that is configured to train a machine learning model to identify the class of a vehicle based upon audio data generated by the vehicle while driving over a road surface and the apparatus that is configured to utilize a trained machine learning model to determine the vehicle class based upon audio data generated by the vehicle while driving over a road surface may each be any of a wide variety of computing devices and may be embodied by either the same or different computing devices. With respect to the computing device configured to train a machine learning model to identify the class of a vehicle based upon audio data generated by the vehicle while driving over a road surface, the apparatus may be embodied by a server, a computer workstation, a distributed network of computing devices, a personal computer or any other type of computing device, while the apparatus configured to utilize a trained machine learning model to identify the class of vehicle based upon the audio data generated by the vehicle while driving over a road surface may similarly be embodied by the same or different server, computer workstation, distributed network of computing devices, personal computer or other type of computing device.

Alternatively, the apparatus configured to utilize the trained machine learning model to determine the class of a vehicle based upon the audio data generated by the vehicle while driving over a road surface may be embodied by a computing device on board the vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus configured to utilize the trained machine learning model to determine the class of a vehicle based upon the audio data generated by the vehicle while driving over a road surface may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

Figure 1:
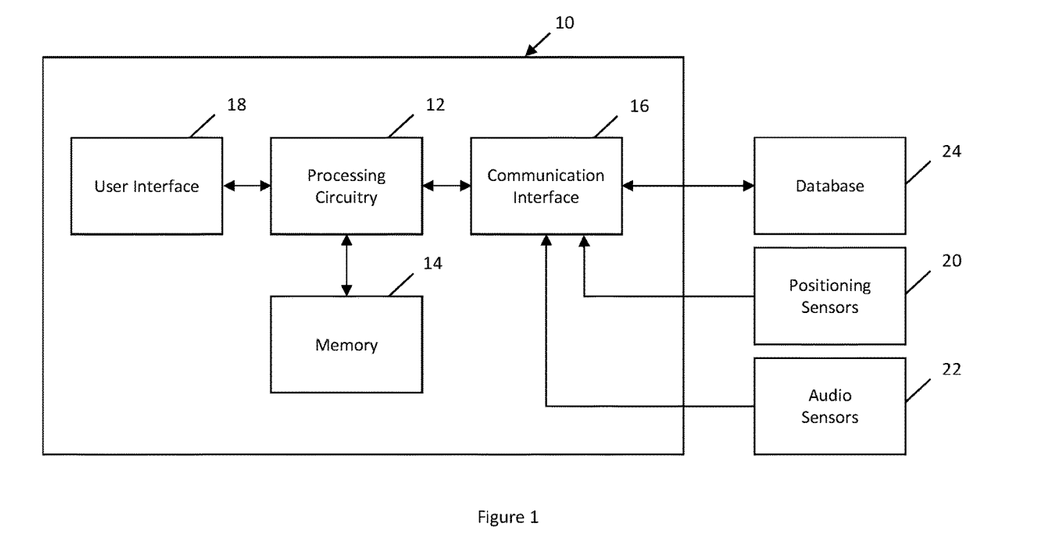
FIG. 1 is a block diagram of an apparatus that may be specifically configured in accordance with an example embodiment.

Regardless of the manner in which the apparatus is embodied, however, the apparatus 10 includes, is associated with, or is in communication with processing circuitry 12, memory 14, a communication interface 16 and optionally a user interface 18 as shown in FIG. 1. In some embodiments, the processing circuitry (and/or co-processors or any other processors assisting or otherwise associated with the processing circuitry) can be in communication with the memory via a bus for passing information among components of the apparatus. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally or alternatively, the memory can be configured to store instructions for execution by the processing circuitry.

The processing circuitry 12 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., one or more map objects, audio data, etc.) generated and/or employed by the processing circuitry 12. Additionally or alternatively, the communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to vehicle or vehicle to infrastructure wireless links.

In certain embodiments, the apparatus 10 can be equipped or associated with one or more positioning sensors 20, such as one or more GPS sensors, one or more accelerometer sensors, one or more light detection and ranging (LiDAR) sensors, one or more radar sensors, one or more gyroscope sensors, and/or one or more other sensors. Any of the one or more sensors may be used to sense information regarding movement, positioning and location, and/or orientation of the apparatus for use, such as by the processing circuitry 12, in navigation assistance and/or autonomous vehicle control, as described herein according to example embodiments.

In certain embodiments, the apparatus 10 may further be equipped with or in communication with one or more audio sensors 22. In an example, embodiment, the one or more audio sensors can be one or more audio capturing devices (e.g., one or more microphones). In some example embodiments, the one or more audio sensors can be implemented in a vehicle or other remote apparatus. For example, the one or more audio sensors can be located proximate to one or more wheels of a vehicle. While embodiments may be implemented with a single microphone audio sensor, particularly if that audio sensor is capable of directional audio detection and positioned to capture audio from multiple points (e.g., from each wheel), other embodiments may include microphone audio sensors at each wheel to capture sounds related to a tire of each wheel as it contacts the roadway. Microphones may be placed inside the body of a wheel directly, between the wheel rim and tire, or the wheel wells of a vehicle to shield the microphone from ambient noises while also shielding each microphone from at least some of the noise generated by other wheels around the vehicle. A microphone may optionally be placed directly above a wheel as tires are generally hollow, semi-rigid surfaces that may effectively transfer the sound through the tire to a microphone above the tire. Certain embodiments may embed microphones directly into the wheel attached to a tire rim, such as within the tire between the tire and the rim similar to conventional tire pressure monitoring sensors. Further, the audio sensors may be directional microphones that may focus their attention at the contact patch where the respective tire meets the road to help further isolate the road noise from each respective tire from surrounding sounds.

The locations of the wheels may each be identified in latitude and longitude based on a location of the vehicle using a sensor, such as a GPS sensor to identify the location of the vehicle. Each vehicle or type of vehicle (e.g., make and model) may also be uniquely configured to identify an offset between the GPS sensor and each of the wheels. Thus, understanding a position of the vehicle through a position of GPS sensor provides an identification of the location of the wheel using the offsets.

In certain embodiments, information detected by the one or more audio sensors can be transmitted to the apparatus 10, such as the processing circuitry 12, as audio data. The audio data transmitted by the one or more audio sensors can be transmitted via one or more wired communications and/or one or more wireless communications (e.g., near field communication, or the like). In some environments, the communication interface 16 can support wired communication and/or wireless communication with the one or more audio sensors.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Figure 2:
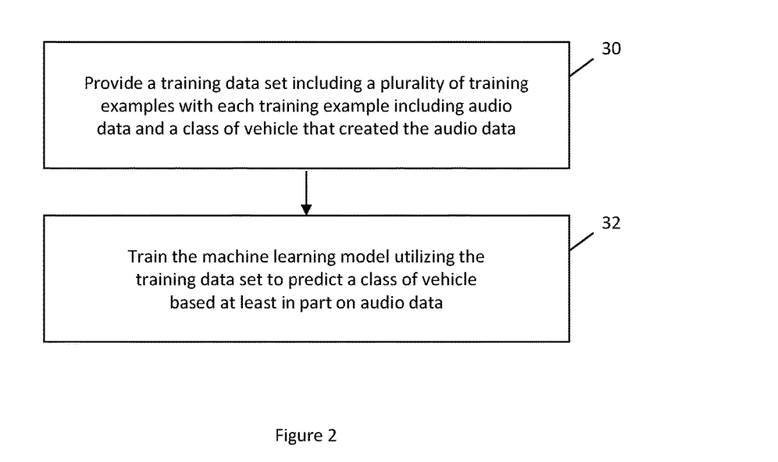
FIG. 2 is a flowchart illustrating the operations performed, such as by the apparatus of FIG. 1, in order to train a machine learning model to identify the class of a vehicle based upon audio data generated by the vehicle driving over a road surface in accordance with an example embodiment.

Referring now to FIG. 2, the operations performed, such as by the apparatus 10 of FIG. 1, in order to train a machine learning model to determine the class of an unknown vehicle based upon audio data generated by the vehicle while driving over a road surface are depicted. As used herein, a vehicle that subsequently drives over the road surface, that is, that drives over the road surface after the machine learning model has been trained, is unknown in that the class of the vehicle is not known in advance or at least not known with a desired degree of certainty. As shown in block 30, the apparatus includes means, such as the processing circuitry 12, memory 14, the communication interface 16 or the like, for providing a training data set that includes a plurality of training examples. In this regard, the training data set may be provided by access by the processing circuitry of the training data set stored by the memory. Alternatively, the training data set may be provided by access by the processing circuitry to a database 24 or other memory device that either may be a component of the apparatus or may be separate from, but accessible to the apparatus, such as the processing circuitry, via the communication interface.

A training example includes audio data created by a vehicle of a known class while driving over a road surface. The audio data includes one or more audio features including one or more audio features selected from a group of one or more audio amplitude features and/or one or more audio frequency features. As such, the audio data may include one or more audio amplitude features without any audio frequency features, one or more audio frequency features without any audio amplitude features, or one or more audio amplitude features as well as one or more audio frequency features. In some embodiments, the audio data may include audio features that are based on a combination, e.g., correlation, of one or more audio amplitude features and one or more audio frequency signals. The audio data that comprises a training example, including the one or more audio features, is collected at the same point in time. Thus, the audio amplitude feature(s) and/or the audio frequency feature(s) of a training example have each been collected at the same time in response to the vehicle driving over a road surface. However, different training examples may include audio data collected at different points in time.

The training example also includes the class of the vehicle that created the audio data, such as a label identifying the class of vehicle. In this regard, the class of vehicle defines the type of vehicle and while vehicle class may be differently defined in various embodiments and by different countries, the Federal Highway Administration of the United States has adopted definitions of a plurality of classes of vehicles including motorcycles, passenger cars, other two-axle four-tire single unit vehicles such as pickups and vans, buses, two-axle six-tire single-unit trucks, three-axle single-unit trucks, four or more axle single-unit trucks, four or fewer axle single-trailer trucks, five-axle single-trailer trucks, six or more axle single-trailer trucks, five or fewer axle multi-trailer trucks, six-axle multi-trailer trucks and seven or more axle multi-trailer trucks.

The audio amplitude features may include the amplitude of the audio signals generated by the vehicle while driving over a road surface and, more particularly, while driving over the road surface at a respective location. The audio frequency features of an example embodiment may include the primary frequency of the audio signals and, in some embodiments, one or more secondary frequencies or the frequency spectrum of the audio signals generated by the vehicle while driving over a road surface and, in one embodiment, while driving over the road surface at a respective location. In some embodiments, audio data is created by a plurality of vehicles of the same class while driving over the road surface and, more particularly, while driving over the same respective location of the road surface with the audio data created by the different vehicles forming different training examples. In these example embodiments, the audio amplitude features may also include one or more statistical measures of the audio amplitude features of the audio data created by the plurality of vehicles of the same class driving over the same respective location along the road surface. By way of example, the statistical measures that serve as one or more audio amplitude features may include the mean, the mode, the median, the standard deviation, the variance, the sigma or the like of the amplitude of the audio signals created by the vehicles of the same class driving over the same respective location along the road surface. Similarly, the statistical measures that serve as one or more audio frequency features may include the mean, the mode, the median, the standard deviation, the variance, the sigma or the like of the frequency of the audio signals created by the vehicles of the same class driving over the same respective location along the road surface. Additionally or alternatively, the audio features may include one or more audio features that relate or correlate audio amplitude features and audio frequency features, such as the amplitude of the audio signals at a respective frequency.

The audio features may be represented in various manners including in terms of the actual amplitude and the actual frequency of the audio signals. In an example embodiment, however, the audio features represent a change in a respective audio signal relative to a noise floor. For example, the audio amplitude features may represent a change in amplitude relative to the noise floor and the audio frequency features may represent a change in frequency relative to the noise floor. The noise floor is an average of the audio signals that are captured as a vehicle, such as a vehicle of the same class, drives over the road surface. In this regard, the noise floor may define an average amplitude of the audio signals and an average frequency of the audio signals generated by a vehicle of the same class as the vehicle drives over the road surface. Thus, the audio amplitude features and the audio frequency features represent deviations from this noise floor, such as may be created by interaction of the vehicle with a map object, such as a road seam, a pothole, a transition to a different paving surface or the like.

In some embodiments, a training example also includes information regarding a map object, such as a map object that is located at the location at which the audio data was captured. One example of a map object is a bridge and, more particularly, the road seam that is defined between the road surface and the bridge surface which typically creates a distinctive audio feature when driven over. Another example of a map object is a railroad crossing which similarly creates a distinct audio feature when a vehicle drives over the railroad crossing. A wide variety of other map objects may exist including, for example, manhole covers, transitions between different types of road surfaces, such as a transition between a smooth road surface and a grooved road surface, or the like. As described in more detail below, the map object that is included in a training example may be determined or provided in various manners. For example, the map object may be defined, either manually or automatically, by reference to a map database 24 and identification of a map object at the same location or at a location proximate, such as within a predefined distance of, the location at which the corresponding audio data was captured.

The map database 24 may include node data, road segment data or link data, point of interest (POI) data, traffic data or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 24 may be maintained by a content provider e.g., the map data service provider and may be accessed, for example, by the content or service provider processing server. By way of example, the map data service provider can collect geographic data and dynamic data to generate and enhance the map database and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The map database 24 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 24 may be a master geographic database, but in alternate embodiments, a client side map database may represent a compiled navigation database that may be used in or with end user devices to provide navigation and/or map-related functions. For example, the map database may be used with the mobile device 104 to provide an end user with navigation features. In such a case, the map database can be downloaded or stored on the end user device which can access the map database through a wireless or wired connection, such as via a processing server and/or a network, for example.

One example of a set of four training examples is provided below in Table 1 in which a class of vehicle is associated with five features with Features 1-4 being different audio features and Feature 5 being information regarding, e.g., the identification of, a map object associated with the audio features, such as by being co-located. Of the audio features, Features 1 and 3 are the frequency and amplitude, respectively, of a first vehicle and Features 2 and 4 are the frequency and amplitude, respectively, of a second vehicle.

TABLE 1

| Vehicle class label | Feature 1 | Feature 2 | Feature 3 | Feature 4 | Feature 5 |
|---|---|---|---|---|---|
| Truck | $F_{Trk1}^{frequency}$ | $F_{Trk2}^{frequency}$ | $F_{Trk1}^{amplitude}$ | $F_{Trk2}^{amplitude}$ | bridge |
| Car | $F_{Car1}^{frequency}$ | $F_{Car2}^{frequency}$ | $F_{Car1}^{amplitude}$ | $F_{Car2}^{amplitude}$ | Railroad crossing |
| Bus | $F_{Bus1}^{frequency}$ | $F_{Bus2}^{frequency}$ | $F_{Bus1}^{amplitude}$ | $F_{Bus2}^{amplitude}$ | bridge |
| Motorcycle | $F_{MC1}^{frequency}$ | $F_{MC2}^{frequency}$ | $F_{MC1}^{amplitude}$ | $F_{MC2}^{amplitude}$ | bridge |

In accordance with an example embodiment, the apparatus 10 also includes means, such as the processing circuitry 12, the memory 14 or the like, configured to train a machine learning model utilizing the training data set. See block 32 of FIG. 2. The machine learning model, as trained, is configured to predict the class of an unknown vehicle driven over the road surface based at least in part upon the audio data created by the unknown vehicle. In this regard, the machine learning model is trained based upon the plurality of audio features of each training example and, in some embodiments, based upon a map object that is associated with the audio data of a training example, such as being co-located with and/or located within a predefined distance of the location at which the audio features were collected. As noted above, during the training of the machine learning model, the training data sets also include an indication of the class of the vehicle that created the audio data to permit the machine learning model to associate a set of audio features and a map object with a respective class of vehicle. Based upon the training examples including the plurality of audio features and, in some embodiments, the associated map objects, the machine learning model is trained to predict the corresponding class of vehicle that would have driven over the road surface in order to create the audio data.

The apparatus 10, such as the processing circuitry 12, may train any of a variety of machine learning models to predict the class of the vehicle that created audio data based upon a plurality of audio features and, in some embodiments, a corresponding map object. Examples of machine learning models that may be trained include a decision tree model, a random forest model, a neural network, a model that employs logistic regression or the like. In some example embodiments, the apparatus, such as the processing circuitry, is configured to separately train a plurality of different types of machine learning models utilizing the same training data including the same plurality of training examples. After having been trained, the apparatus, such as the processing circuitry, is configured to determine which of the plurality of machine learning models predicts the class of vehicle that creates the audio data with the greatest accuracy. The machine learning model that has been trained to most accurately predict the class of vehicle that creates the audio data when driven over a road and interacting, for example, with various map objects is then identified and is thereafter utilized to predict the class of vehicle in response to audio data that has been collected while a vehicle of an unknown class is driven over a road surface.

The apparatus 10, such as the processing circuitry 12, is configured to determine the probability with which a machine learning model, as trained, predicts the class of vehicle that creates audio data that is captured while the vehicle drives over a road surface in any of various manners. In an example embodiment, one or more additional data sets may be provided that include audio data as described above and a label identifying the class of the vehicle that has driven over the road surface to create the audio data of the respective data set. The apparatus, such as the processing circuitry, then separately utilizes each of the machine learning models, as trained, to predict the class of vehicle with the plurality of machine learning models being provided with the audio data of the one or more additional data sets, but without providing the machine learning models with the class of vehicle that created the audio data. Based upon an analysis of the predictions provided by the plurality of machine learning models, the apparatus, such as the processing circuitry, is configured to identify the machine learning model that has been trained to predict the class of vehicle that creates the audio data in the most accurate manner. This machine learning model that is identified as the most accurate may then be utilized to predict a class of vehicle based upon audio data that has been collected without knowledge of the class of vehicle driven over the road surface during the creation of the audio data.

In some example embodiments, the apparatus 10, such as the processing circuitry 12, may be configured to evaluate the machine learning model, as trained, to determine the preferred audio features to be processed by the machine learning model in order to efficiently generate a prediction of the class of vehicle that would have created the audio data including the plurality of audio features. Relative to the audio data that includes a plurality of audio features created by the interaction of a vehicle of a known class with a map object, the apparatus, such as the processing circuitry, is configured to provide different combinations of audio features to the machine learning model and to determine the accuracy with which the machine learning model predicts the class of the vehicle driven over the road surface to create the audio data and the efficiency with which the machine learning model predicts the class of vehicle. In this regard, the efficiency may be defined in various manners including the time taken by the machine learning model to predict the class of vehicle, the processing resources required to predict the class of vehicle, the memory resources required to predict the class of vehicle, the number of computations required to predict the class of vehicle, etc. Based upon the efficiency and the accuracy with which the machine learning model predicts the class of vehicle in response to different combinations of the audio features, the preferred set of audio features that allows the machine learning model to provide a reasonably accurate prediction of the class of vehicle in an efficient manner may be identified.

In some example embodiments, a balance or trade off between the accuracy with which the class of vehicle is predicted and the efficiency with which the machine learning model predicts the class of vehicle is considered. For example, a first combination of audio features may produce the most accurate prediction of the class of vehicle, but a second combination of audio features may produce a prediction of the class of vehicle that is only slightly less accurate, but that is significantly more efficient in terms of its prediction. Thus, the second combination of audio features that provide for sufficient, even though not the greatest, accuracy, but does so in a very efficient manner may be identified by the apparatus 10, such as the processing circuitry 12, as the preferred combination of audio features to be provided to the machine learning model in order to predict the class of vehicle in subsequent instances in which the audio data that has been captured includes at least the preferred combination of audio features.

As described above, the training examples each include audio data and, more particularly, a plurality of audio features and a label that identifies the class of vehicle that created the audio data and, in some embodiments, information that identifies a map object associated with the audio data, such as being co-located with or within a predefined distance of the location at which the audio data was captured. In some example embodiments, at least some of the training examples may also include one or more additional types of information or data. For example, the audio data created by a vehicle of a certain class driving over a road surface may vary based upon the speed of the vehicle. For example, a passenger car driving across a railroad crossing at 5 mph and at 25 mph may create two different and distinctive sets of audio features. Thus, in an example embodiment, at least some of the training examples may also include the speed at which the vehicle was driven at the time at which the audio data was captured. By being trained to predict the class of vehicle based not only upon the audio data and, in some embodiments, the map object, but also, in some embodiments, based upon the speed of the vehicle, the machine learning model, as trained, may thereafter be utilized to predict the class of vehicle with enhanced accuracy and/or efficiency in instances in which the audio data that has been collected is also associated with the speed of the vehicle at the time at which the audio data was collected.

The training examples may be constructed in a variety of different manners. In one embodiment that is provided with reference to FIG. 3 by way of example, but not of limitation, however, the apparatus 10 includes means, such as the processing circuitry 12, the memory 14 or the like, for constructing the respective training example by identifying a map object with reference to a map database, such as stored by the memory or a database 24 with which the apparatus, such as the processing circuitry, is in communication via the communication interface 16. See block 40. In this example embodiment, the apparatus, such as the processing circuitry, is configured to identify the audio data that was captured at a location proximate the map object by reference to an audio database, such as provided by the memory or by a database, with which the apparatus, such as the processing circuitry, is in communication via the communication interface. See block 42 of FIG. 3. In this regard, the audio database provided by the map database and, as a result, may be stored by the same database that stores the map database. Alternatively, the audio database may be distinct from the map database and stored by the same or a different database than that which stores the map database. The audio data is associated with a location at which the audio data was previously captured and the audio data that is identified in conjunction with a respective map object has a location that is proximate the map object. Thus, the audio data that is identified may be associated with the same location as the location of the map object or with a location that is within a predefined distance of the location of the map object. In addition to including the plurality of audio features, the audio data that is identified may not only be associated with a location at which the audio data was captured, but may also be associated with a class of vehicle that created the audio data and, in some embodiments, a speed with which the vehicle was traveling at the time at which the audio data was created. As shown in block 44, the apparatus of an example embodiment also includes means, such as the processing circuitry or the like, for identifying the class of vehicle that created the audio data. Based upon the audio data that is identified, a training example is constructed for each instance of audio data that is identified to be proximate the respective map object with each training example including the audio features of a respective instance of the audio data, a corresponding map object and a label identifying the class of vehicle that created the audio data and optionally an indication of the speed at which the vehicle was traveling when the audio data was created.

Although the map database and the audio database may be constructed in various manners, the audio database may be included within or otherwise associated with the map database. In one example embodiment, the audio database is defined by an audio layer that is associated with the map database. In this example embodiment, the audio layer includes the audio data and the related information, such as the class of vehicle and optionally the speed of the vehicle, and is associated with a location that is correlated to the locations of the various map objects maintained by the map database. While all of the audio data may be included in a single audio layer in some embodiments, the audio database of other example embodiments includes a plurality of audio layers, each of which is correlated to the map database including the plurality of map objects based upon the respective locations of the audio data in the audio layer and the map objects in the map database. In these other example embodiments in which the audio database includes a plurality of audio layers, each audio layer may include the audio data created by a different respective class of vehicle. Thus, one audio layer would be associated with audio data created by passenger automobiles, while a different audio layer would include audio data created by a motorcycle.

The audio layer including the audio data created by a respective class of vehicle may, in some embodiments, be further divided into a plurality of sub-layers, each of which includes the audio data created by the respective class of vehicle while traveling at a different respective speed or a different respective range of speeds. By way of example, the audio layer that includes audio data created by a passenger automobile may include a plurality of sub-layers including a first audio sub-layer that includes the audio data captured for a passenger automobile traveling at less than 20 mph, a second audio sub-layer including the audio data captured for a passenger automobile traveling between 20 and 30 mph, a third audio sub-layer including the audio data captured for a passenger automobile traveling at a speed between 30 and 40 mph, etc.

Further details are provided by U.S. patent application Ser. No. 16/699,907 filed Dec. 2, 2019 and U.S. patent application Ser. No. 16/699,921 filed Dec. 2, 2019, the entire contents of each of which are expressly incorporated by reference herein in their entirety.

Figure 4:
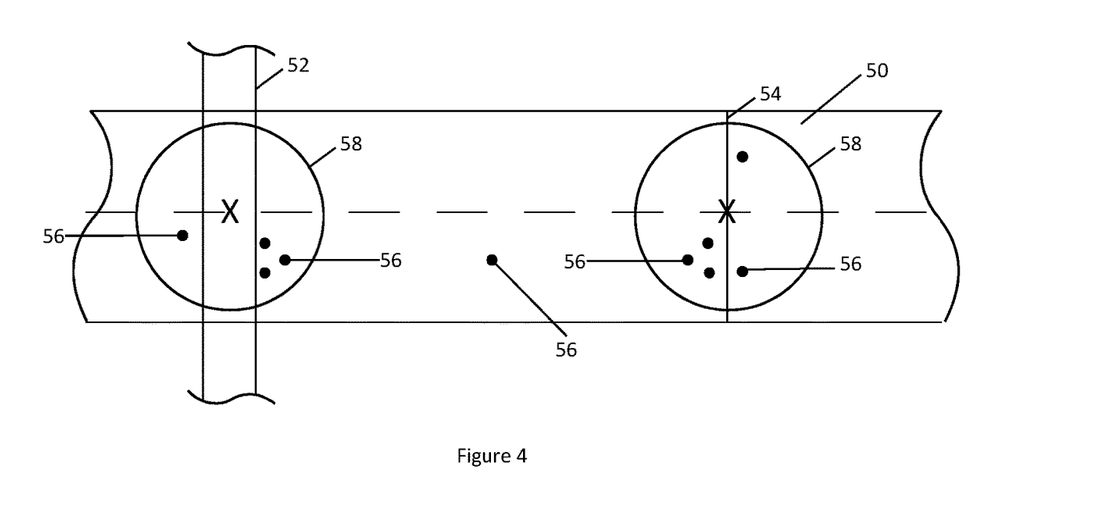
FIG. 4 is a graphical representation of a road surface having several different map objects, such as a set of railroad tracks and a seam defining a transition to a different road surface, such as the road surface of a bridge or the like, as well as audio data associated with different locations proximate the various map objects and created by vehicles driving over the road surface.

In order train the machine learning model, the apparatus 10, such as the processing circuitry 12, the memory 14 or the like, of an example embodiment may therefore be configured to identify a map object from the map database and to then identify and access the audio data associated with the selected map object, such as by the audio data that is co-located with the map object or that is within a predefined distance of the map object. With reference to FIG. 4 by way of example, a road segment 50 including two map objects, namely, railroad tracks 52 and a seam 54 being two different types of road surfaces, is depicted. In the map database 24, each map object is associated with a location along the road segment as represented by an X in FIG. 4. In this example, the instances of audio data proximate a respective map object are identified. In FIG. 4, the instances of audio data are represented by dots 56 and those instances of audio data that are within a predefined distance of the location of a respective map object (as represented by the outline 58) are identified to be proximate the respective map object. The apparatus, such as the processing circuitry, of this example embodiment is then configured to construct training examples based upon the map object and associated audio data and to then train the machine learning model utilizing the training examples such that the resulting machine learning model is capable of predicting the class of vehicle that creates audio data, preferably in an accurate and efficient manner.

Once the machine learning model has been trained, the machine learning model may be utilized to predict the class of vehicle traveling over a road surface based upon audio data that is created by the vehicle even though the class of vehicle is not known in advance. As shown in block 60 of FIG. 5, the apparatus 10 of this example embodiment includes means, such as the processing circuitry 12, the memory 14, the communication interface 16 or the like, for obtaining audio data created by a vehicle while driving over a road surface. The audio data includes a plurality of audio features including one or more audio amplitude features or one or more audio frequency features or a combination of audio amplitude features and audio frequency features, such as described above. The audio data may be collected by one or more audio sensors on board the vehicle. For example, the audio sensors may be associated with one or more respective wheels of the vehicle that is driving over the road surface. The apparatus, such as the processing circuitry, may be configured to obtain the audio data that has been collected by the audio sensor(s) and to utilize the trained machine learning model to predict the class of vehicle that has created the audio data. This prediction may occur in real time or near real time while the vehicle continues to travel over the road network or at some later time after the vehicle has driven over the road surface. In an instance in which the prediction occurs at a later point in time, the audio data may be collected and stored by the memory or a database 24 with which the apparatus, such as the processing circuitry, the communication interface or the like, is in communication and may be subsequently accessed, such as in a batch process, in order to permit the classes of a plurality of vehicles that have traveled over the road surface, such as during some predefined window of time, to be analyzed and/or to permit a distribution of the classes of vehicle that travel over a respective road surface, such as during a predefined period of time, to be constructed.

Figure 5:
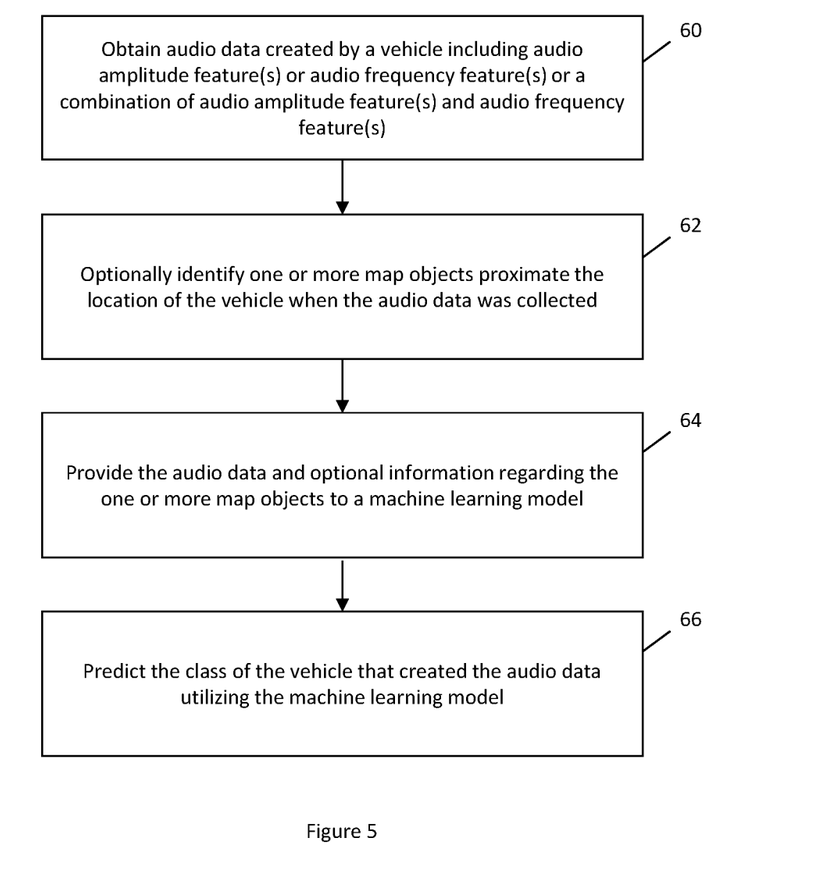
FIG. 5 is a flowchart illustrating the operations performed, such as by the apparatus of FIG. 1, in accordance with an example embodiment in order to utilize a trained machine learning model to identify the class of a vehicle driving over a road surface based upon audio data.

As shown in block 64 of FIG. 5, the apparatus 10 of this example embodiment also includes means, such as the processing circuitry 12, the memory 14, the communication interface 16 or the like, for providing the audio data including one or more audio amplitude features or one or more audio frequency features or a combination of one or more audio amplitude features and one or more audio frequency features, to the machine learning model, as has been trained, such as described above with respect to FIG. 2. In this example embodiment, the apparatus further includes means, such as the processing circuitry or the like, for predicting the class of vehicle that created the audio data utilizing the machine learning model. See block 66 of FIG. 5.

In an example embodiment in which a preferred combination of audio features has been identified to permit the machine learning model to predict the class of vehicle with sufficient accuracy and efficiency, the apparatus 10, such as the processing circuitry 12 or the like, is configured to determine whether the audio data that has been obtained includes at least the preferred combination of audio features. In an instance in which the audio data that is obtained does include the preferred combination of audio features, the apparatus, such as the processing circuitry, the memory 14 or the like, may be configured to provide the preferred combination of audio features to the machine learning model without providing any additional audio features that are included within the audio data that has been collected and obtained. Thus, the apparatus, such as the processing circuitry of this example embodiment may be configured to predict the class of vehicle that created the audio data in an accurate manner, but to do so efficiently, based upon the preferred combination of audio features. However, in an instance in which the audio data that is obtained does not include the preferred combination of audio features (such as by failing to include one or more of the preferred combination of audio features), the apparatus, such as the processing circuitry, the memory or the like, may be configured to provide all of the audio features that have been obtained to the machine learning model including, for example, one or more audio features that are not included within the preferred combination of audio features.

In some example embodiments, the apparatus 10, such as the processing circuitry 12, is configured to provide the machine learning model not only with the audio data, but also with information regarding one or more map objects. In this regard, the audio data that has been collected may have been created at the same location or proximate to, such as within a predefined distance of, a map object. Indeed, the interaction of the vehicle with the map object may have caused the audio data to be created. Thus, the apparatus of this example embodiment includes means, such as the processing circuitry, the memory 14, the communication interface 16 or the like, for identifying one or more map objects and for providing information regarding the one or more map objects to the machine learning model in conjunction with the audio data. See blocks 62 and 64 of FIG. 5. In this example embodiment, the apparatus, such as the processing circuitry, is configured to predict the class of vehicle utilizing the machine learning model and based upon both the one or more map objects and the audio data.

The one or more map objects may be identified in various manners. In an example embodiment, the audio data that is collected by one or more audio sensors on board the vehicle is associated with the location of the vehicle at the time at which the audio data is captured. For example, the location may be provided by a location sensor, such as a GPS sensor, on board or otherwise configured to monitor the location of the vehicle. In this example embodiment, the apparatus 10, such as the processing circuitry 12, the memory 14, the communication interface 16 or the like, is configured to obtain the audio data that is collected and, based upon the location of the vehicle at which the audio data was collected, to also identify the one or more map objects at or proximate, that is, within a predefined distance of, that same location, such as by reference to a map database. For example, the audio data that is obtained may include a corresponding location at which the audio data was captured. The apparatus, such as the processing circuitry, the memory, the communication interface or the like, is then configured to access a map database that includes one or more map objects, each of which is associated with a respective location. Based upon the location of the audio data that has been obtained, the apparatus, such as the processing circuitry, is configured to identify one or more map objects that are associated with the same location or with a location that is proximate to, such as by being within a predefined distance of, the location at which the audio data was captured.

One example of four different instances of audio data is depicted below in relation to Table 2. Each instance of audio data includes four audio features and an associated map object (feature 5). In this example, the first audio feature is the primary frequency, the second audio feature is the mean of the frequencies, the third audio frequency is the amplitude and the fourth audio frequency is the amplitude of the primary frequency.

TABLE 2

| Feature 1 | Feature 2 | Feature 3 | Feature 4 | Feature 5 |
|---|---|---|---|---|
| $F_{Trk1}^{frequency}$ | $F_{mean}^{frequency}$ | $F_{Trk1}^{amplitude}$ | $F_{primfreq}^{amplitude}$ | bridge |
| $F_{Car1}^{frequency}$ | $F_{mean}^{frequency}$ | $F_{Car1}^{amplitude}$ | $F_{primfreq}^{amplitude}$ | Railroad crossing |
| $F_{Bus1}^{frequency}$ | $F_{mean}^{frequency}$ | $F_{Bus1}^{amplitude}$ | $F_{primfreq}^{amplitude}$ | bridge |
| $F_{MC1}^{frequency}$ | $F_{mean}^{frequency}$ | $F_{MC1}^{amplitude}$ | $F_{primfreq}^{amplitude}$ | bridge |

Although audio data may be collected over a period of time, such as continuously, while a vehicle drives over a road surface, the audio data that is obtained and is utilized to predict the class of vehicle may be only a subset of all of the audio data that is collected, with the subset of audio data being that audio data that is more distinctive and, as a result, more likely to be indicative of interaction of the vehicle with a map object as opposed to audio data that is merely representative of background or normal road noise. In this regard and as described above, the audio features, such as the one or more audio amplitude features or the one or more audio frequency features or a combination of one or more audio amplitude features and one or more audio frequency features, that represent a change in amplitude and/or a change in frequency relative to a noise floor are identified, such as by the apparatus 10, such as the processing circuitry 12.

The noise floor represents the average background noise for a vehicle driving over the road surface. As the average background noise generally varies depending upon the speed with which the vehicle is traveling, the audio data that is collected and is subsequently obtained in accordance with an example embodiment may be associated with the speed of the vehicle at the time at which the audio data was collected. In this regard, the speed of the vehicle may be provided by a speed sensor carried by the vehicle and saved in association with the audio data that is collected. As such, different noise floors may be defined for different speeds at which a vehicle is traveling at the time at which the audio data is collected. However, as the class of vehicle that is traveling over the road surface is unknown during the utilization of the trained machine learning model, the noise floor is typically not dependent upon the class of vehicle.

Thus, the apparatus of an example embodiment that includes different noise floors for different speeds or different ranges of speeds includes means, such as the processing circuitry 12 or the like, for receiving an indication of the speed of the vehicle. In this regard, the audio data that is obtained may be associated with the speed of the vehicle at the time at which the audio data was collected such that the speed of the vehicle is received in conjunction with obtaining the audio data. In this example embodiment, the apparatus also includes means, such as the processing circuitry, the memory 14 or the like, for determining the noise floor based at least in part upon the speed of the vehicle. In this regard, the noise floor may have been defined in advance for each of a plurality of different vehicle speeds or different ranges of vehicle speeds with the noise floor that has been defined for the speed or range of speeds at which the vehicle was traveling while collecting the audio data being identified for use in conjunction with the audio data. Alternatively, the noise floor may be defined by the apparatus, such as the processing circuitry, based upon the audio data collected by the vehicle under analysis so as to be representative of the average road noise collected as audio data while the vehicle drives over the road network.

Once the noise floor has been determined, such as based upon the speed of the vehicle, the apparatus 10 of this example embodiment, such as the processing circuitry 12, is configured to identify the audio features that differ from the noise floor by a predefined amount or by a predefined percentage and may then utilize only the audio data that differs from the noise floor by the predefined amount or the predefined percentage in order to determine the class of the vehicle that created the audio data. Additionally or alternatively, the apparatus, such as the processing circuitry, the memory 14 or the like, may be configured to only store those instances of the audio data that differ from the noise floor by the predefined amount or the predefined percentage, thereby increasing the efficiency with which the audio data may be stored and retrieved while still retaining the audio data that is representative of the most significant deviations from background road noise and that are therefore the most useful with respect to the identification of the class of vehicle creating the audio data.

As described above, the map objects may be stored in a map database that identifies the different types of map objects and the location at which the map objects are located. Additionally, an audio database may be maintained, such as by the memory 14 or a database 24 with which the apparatus 10, such as the processing circuitry 12, is in communication, such as via the communication interface 16, with the audio database including the audio data that has been captured. In an example embodiment, the audio database may be an audio layer including the audio data and correlated, such as based upon the location at which the audio data was collected, to the map database and, more particularly, to the locations of the plurality of map objects included within the map database. As also described above, the audio layer of an example embodiment may include a plurality of sub-layers, each of which is associated with the audio data that has been collected for a vehicle traveling at a different speed or within a different range of speeds. Thus, the apparatus of an example embodiment, such as the processing circuitry, the memory, the communication interface or the like, may be configured to obtain the audio data by reference to an audio layer and may obtain the corresponding map object(s) by reference to the map database.

In an example embodiment, the apparatus 10 also includes means, such as the processing circuitry 12, configured to determine the prediction confidence associated with the class of vehicle that has been predicted by the machine learning model. In this regard, the prediction confidence is an indication of the correctness of the prediction of the class of vehicle and, in one embodiment, may range from zero in which there is no confidence in the prediction to one in which there is absolute confidence in the prediction. The prediction confidence may be determined in various manners. For example, the machine learning model as implemented by the apparatus, such as the processing circuitry, of an example embodiment is configured to determine the prediction confidence based upon the alignment of the data that has been collected for analysis by the machine learning model with the data of the training data sets. More alignment results in increased prediction confidence, while less alignment results in less prediction confidence. In terms of alignment, the type of data and/or the value of the data may be considered. Data that has been collected that is of the same type and that has a value within a predefined range of the value of the same type of data from the training data sets provides for increased alignment and correspondingly increased predication confidence. Conversely, data that has been collected that is of a different type or that has a value that is outside of a predefined range of the value of the same type of data from the training data sets provides for reduced alignment and correspondingly reduced predication confidence. By way of example, in an instance in which the collected data includes the same five types of data with the same range of values as the training data, the prediction confidence will be greater than an instance in which the collected data only has three of the five types of data as the training data, even if the data remains within the same range of values.

In this example embodiment, in an instance in which the confidence in the prediction by the machine learning model is considered high, such as in an instance in which the prediction confidence exceeds a first predefined value, such as by being greater than 0.75, the prediction provided by the machine learning model as to the class of the vehicle may be accepted. In contrast, in an instance in which the confidence in the prediction by the machine learning model is considered low, such as in an instance in which the prediction confidence is less than a second predefined value, such as by being less than 0.5, the prediction provided by the machine learning model may be rejected and the class of the vehicle based upon the audio data may remain unknown or indeterminate notwithstanding the prediction provided by the machine learning model due to the relatively low prediction confidence.

In an intermediate instance in which the prediction confidence is between the first and second predefined values, the prediction of the vehicle class provided by the machine learning model may be considered to be possibly correct but without sufficient confidence to rely upon the prediction without further substantiation. In this example embodiment, the class of the vehicle that has been predicted may be subjected to further verification. Although this further verification may be provided in various manners, the verification of class of vehicle may, in some embodiments, be provided by manual or automated analysis of one or more images of the vehicle obtained by traffic cameras or other techniques for capturing and analyzing images of a road network and the traffic thereover. In an instance in which the prediction by the machine learning model is verified, the predicted class of vehicle may then be accepted. However, if the class of vehicle that has been predicted by the machine learning model is unable to be verified, the predicted class of vehicle may be rejected and the class of the vehicle may be considered unknown or indeterminate notwithstanding the prediction provided by the machine learning model. By utilizing prediction confidence in this example embodiment, the predictions of vehicle class provided by the machine learning model and subsequently accepted based upon the prediction confidence may then be utilized with greater confidence in the results.

Based upon the prediction of the class of vehicle that created the audio data, the method, apparatus 10 and computer program product of an example embodiment may provide a variety of advantages. For example, information regarding the number of vehicles of the different classes that travel over a road segment, such as a distribution of the different classes of vehicles that travel over a road segment, may be collected and provided, such as to federal, state, local or other governmental or regulatory authorities responsible for the construction and maintenance of the road network. This information may facilitate the subsequent construction of road networks to ensure that the resulting road networks are designed to support the different classes of vehicle that are anticipated to travel thereover. Additionally, this information may facilitate the maintenance of roads by permitting those roads having greatest use by heavier vehicles that may create more damage to the roads to be reviewed for maintenance on a more regular basis.

The information regarding the class of vehicle that has created audio noise may also be utilized in a more specific manner, such as to provide targeted information or advertisements to a respective vehicle based upon the class of vehicle as predicted by the machine learning model. In this regard, the targeted advertising or other information may be provided via a computing device, such as a navigation, mapping or infotainment system, carried by the vehicle or via a mobile device carried by the driver or other occupant of the vehicle. By way of example, in an instance in which the vehicle is identified to be a truck and trailer combination having four or more axles, information may be provided regarding upcoming truck stops or other areas that are designed to facilitate ingress and egress by a tractor trailer. Alternatively, in an instance in which the vehicle is identified to be a motorcycle, targeted advertising relating to nearby motorcycle rallies or motorcycle stores or information regarding routes that have been frequented in the past by motorcyclists, such as scenic routes, may be provided in order to improve the user experience.

Figure 3:
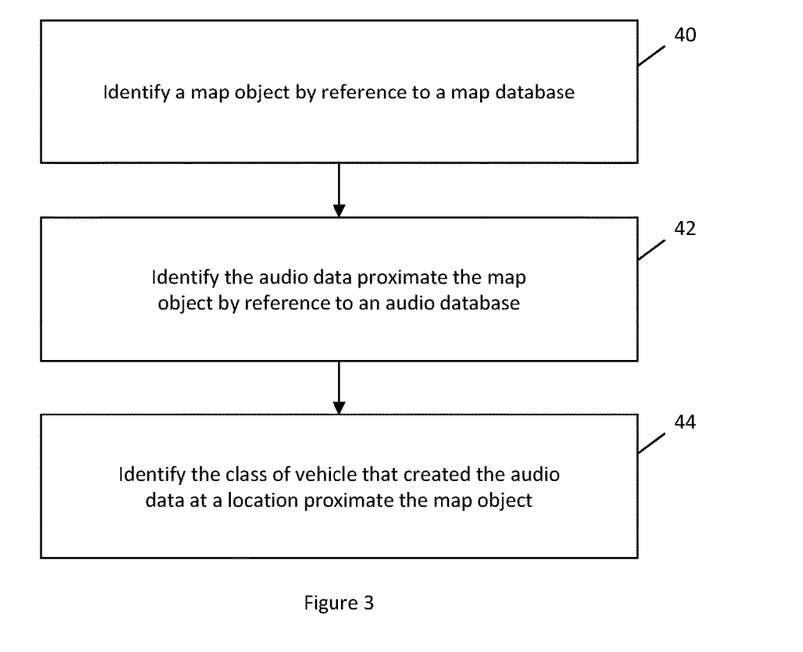
FIG. 3 is a flowchart illustrating the operations performed, such as by the apparatus of FIG. 1, in order to construct a training example in accordance with an example embodiment.

FIGS. 2, 3 and 5 illustrate flowcharts depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus configured to predict a class of a vehicle based at least in part on audio data, the apparatus comprising at least one processor and at least one memory storing computer program code, the at least one memory and the computer program code configured to, with the processor, cause the apparatus to at least:

obtain the audio data created by the vehicle while driving over a road surface, wherein the audio data comprises one or more audio amplitude features;
provide the audio data including the one or more audio amplitude features to a machine learning model;
predict the class of the vehicle that created the audio data utilizing the machine learning model;
identify one or more map objects; and
provide information regarding the one or more map objects to the machine learning model,
wherein the at least one memory and the computer program code are configured to, with the processor, cause the apparatus to predict the class of the vehicle by predicting the class of the vehicle utilizing the machine learning model and based upon the one or more map objects and the audio data.

2. The apparatus according to claim 1, wherein the at least one memory and the computer program code are further configured to, with the processor, cause the apparatus to receive an indication of a location of the vehicle, wherein the at least one memory and the computer program code are configured to, with the processor, cause the apparatus to obtain the audio data by obtaining the audio data captured proximate the location of the vehicle, and wherein the at least one memory and the computer program code are configured to, with the processor, cause the apparatus to identify the one or more map objects by identifying the one or more map objects proximate the location of the vehicle.

3. The apparatus according to claim 1, wherein the at least one memory and the computer program code are configured to, with the processor, cause the apparatus to obtain the audio data by capturing the audio data associated with one or more respective wheels of the vehicle while driving over the road surface and associating the location of the vehicle during creation of the audio data therewith.

4. The apparatus according to claim 1, wherein the one or more audio amplitude features represent a change in amplitude relative to a noise floor.

5. The apparatus according to claim 4, wherein the at least one memory and the computer program code are further configured to, with the processor, cause the apparatus to:
receive an indication of a speed of the vehicle; and
determine the noise floor based at least in part upon the speed of the vehicle.

6. A method for predicting a class of a vehicle based at least in part on audio data, the method comprising:
obtaining the audio data created by the vehicle while driving over a road surface, wherein the audio data comprises one or more audio frequency features;
providing the audio data including the one or more audio frequency features to a machine learning model;
predicting the class of the vehicle that created the audio data utilizing the machine learning model;
identifying one or more map objects; and
providing information regarding the one or more map objects to the machine learning model.

7. The method according to claim 6, further comprising receiving an indication of a location of the vehicle, wherein obtaining the audio data comprises obtaining the audio data captured proximate the location of the vehicle, and wherein obtaining the one or more map objects comprises identifying the one or more map objects proximate the location of the vehicle.

8. The method according to claim 6, wherein obtaining the audio data comprises capturing the audio data associated with one or more respective wheels of the vehicle while driving over the road surface and associating the location of the vehicle during creation of the audio data therewith.

9. The method according to claim 6, wherein the one or more audio frequency features represent a change in frequency relative to the noise floor.

10. The method according to claim 9, further comprising:
receiving an indication of a speed of the vehicle; and
determining the noise floor based at least in part upon the speed of the vehicle.

11. An apparatus configured to train a machine learning model to predict a class of an unknown vehicle driving over a road surface, the apparatus comprising at least one processor and at least one memory storing computer program code, the at least one memory and the computer program code configured to, with the processor, cause the apparatus to at least:
provide a training dataset comprising a plurality of training examples, wherein a respective training example comprises audio data created by a vehicle of a known class while driving over a road surface, wherein the audio data comprises one or more audio features selected from one or more audio amplitude features and one or more audio frequency features, and wherein the respective training example also comprises the class of the vehicle that created the audio data; and
train the machine learning model utilizing the training dataset such that the machine learning model, as trained, is configured to predict the class of the unknown vehicle driven over the road surface based at least in part upon the audio data created by the unknown vehicle wherein the respective training example further comprises a map object.

12. The apparatus according to claim 11, wherein the at least one memory and the computer program code are configured to, with the processor, cause the apparatus to provide the training dataset by constructing the respective training example by identifying the map object by reference to a map database and identifying the audio data proximate the map object by reference to an audio database, wherein the audio data is associated with a location proximate the map object at which the audio data was previously captured.

13. The apparatus according to claim 12, wherein the at least one memory and the computer program code are further configured to, with the processor, cause the apparatus to construct the respective training example by identifying the class of the vehicle that created the audio data while driving over the road surface at the location proximate the map object.

14. The apparatus according to claim 12, wherein the at least one memory and the computer program code are configured to, with the processor, cause the apparatus to identify the audio data by identifying the audio data proximate the map object from an audio layer of the map database, wherein the audio layer defines a plurality of instances of audio data in association with respective locations.

* * * * *